(12) United States Patent
LaForge et al.

(10) Patent No.: US 12,385,547 B2
(45) Date of Patent: Aug. 12, 2025

(54) SHOCK ABSORPTION ASSEMBLY

(71) Applicant: Cane Creek Cycling Components, Inc., Fletcher, NC (US)

(72) Inventors: Jeff LaForge, Asheville, NC (US); Brandon Blakely, Chesnee, SC (US); Rob Bee, Brevard, NC (US)

(73) Assignee: Cane Creek Cycling Components, Inc., Fletcher, NC (US)

( * ) Notice: Subject to any disclaimer, the term of this patent is extended or adjusted under 35 U.S.C. 154(b) by 624 days.

(21) Appl. No.: 17/542,097

(22) Filed: Dec. 3, 2021

(65) Prior Publication Data

US 2023/0175573 A1 Jun. 8, 2023

(51) Int. Cl.
*F16F 13/00* (2006.01)
*B62K 25/08* (2006.01)
*B62K 25/28* (2006.01)

(52) U.S. Cl.
CPC ............ *F16F 13/002* (2013.01); *B62K 25/08* (2013.01); *B62K 25/286* (2013.01);
(Continued)

(58) Field of Classification Search
CPC .. F16F 9/062; F16F 9/063; F16F 9/065; F16F 9/0209; F16F 9/3214; F16F 9/3235; F16F 9/366; F16F 9/437; F16F 9/49; F16F 13/002; F16F 2222/126; F16F 2228/001; F16F 2232/08; F16F 2234/02; F16F 9/06; F16F 9/067; F16F 9/22; F16F 9/32; F16F 9/34; F16F 9/36; F16F 9/44; F16F 9/54; F16F 9/56; F16F 9/461; F16F 9/486;
(Continued)

(56) References Cited

U.S. PATENT DOCUMENTS 9,713,945 B1* 7/2017 Arnott ...................... B60G 3/20
2006/0180966 A1* 8/2006 Miyashiro ............ B60G 13/005
267/221
(Continued)

FOREIGN PATENT DOCUMENTS

CN 201100360 8/2008
CN 103527698 A 1/2014
(Continued)

OTHER PUBLICATIONS

Stratos Rear Shock Manual, https://www.retrobike.co.uk/threads/stratos-rear-shock-manual.153141/, visited Jun. 30, 2023, 6 pages.
(Continued)

*Primary Examiner* — Robert A. Siconolfi
*Assistant Examiner* — San M Aung
(74) *Attorney, Agent, or Firm* — Dority & Manning, P.A.

(57) ABSTRACT

Shock absorption assemblies are provided. A shock absorption assembly includes an air shock that has a valve body. An air spring tube defines an air spring chamber. A piston rod extends through the air spring chamber to an oil piston head. An air piston head movably coupled to the piston rod. An oil damper tube is coupled to the piston head and is movable relative to the piston rod and the air spring tube. The shock absorption assembly further includes a mechanical spring disposed radially outward from, and that annularly surrounds, at least a portion of the air shock.

17 Claims, 10 Drawing Sheets

(52) U.S. Cl.
CPC ... *F16F 2222/126* (2013.01); *F16F 2228/001* (2013.01); *F16F 2232/08* (2013.01); *F16F 2234/02* (2013.01)

(58) Field of Classification Search
CPC ........ B62K 25/04; B62K 25/08; B62K 25/28; B62K 25/286; B62K 3/02; B62K 25/06; B62K 25/10; B62K 25/283; B62K 2025/044; B62K 2025/045; B62K 2025/048; B60G 15/12; B60G 15/065; B60G 15/066; B60G 17/021; B60G 2202/30; B60G 2202/312; B60G 2202/314; B60G 2500/10
USPC ........................................................ 267/221
See application file for complete search history.

(56) References Cited

U.S. PATENT DOCUMENTS

| | | | | |
|---|---|---|---|---|
| 2012/0261869 | A1* | 10/2012 | Rodenbeck | B60G 17/08 267/219 |
| 2015/0034436 | A1* | 2/2015 | McAndrews | B62K 25/28 188/297 |
| 2015/0108700 | A1* | 4/2015 | Sumida | B62K 25/283 267/221 |
| 2017/0030427 | A1* | 2/2017 | Hunter | F16F 9/44 |

FOREIGN PATENT DOCUMENTS

| | | |
|---|---|---|
| TW | 201838862 A | 11/2018 |
| WO | WO1996009203 A1 | 3/1996 |

OTHER PUBLICATIONS

EBay Retro Stratos Helix Pro Rear Shock 400x1.86 6.5 inch Black Nos. HP116P14A, https://www.ebay.com/itm/145162212458?hash=item21cc57946a:g:rUQAAOSwzatizp6e&amdata=enc%3AAQAIA AAA0CWW7pO2wArK5yDxwqkFWcxRJgESJ4aWUBIRJgDRcS 7tjaHiKSPDMhn5bgPXfqWABvc0pLYVYxN01iWEOflURX4MiQ 7ydKIdE3KZ18ArXzs0oG7BgiNFHN4rb4016iT9SFTepiP31XKoO 0tpeUiF4k%2BX1VzKyoMEgDXY9gtVg4JVMALB65eB2GsaEH 34cw6CiVN537IpwaKA%2B759w3%2F4z2G% 2BMubjVGhOuzVLfUj% 2FPvybZdUWVn1f7QXiP81rJac39mTwrAfDOCTj1Q6rc9%2B7% 2F1s%3D%7Ctkp%3ABFBM4tbshKFi, visited on Jun. 30, 2023, 7 pages.
TW Search Report Corresponding with Application No. 111146275 on Aug. 28, 2023 (1 page).

* cited by examiner

SHOCK ABSORPTION ASSEMBLY

FIELD OF THE INVENTION

The present disclosure relates generally to shock absorption systems for use with a bicycle. In particular, the present disclosure relates to a shock absorption system having a hybrid spring assembly.

BACKGROUND OF THE INVENTION

The increased popularity in recent years of off-road cycling, particularly on mountains and cross-country, has made a shock absorbing system in many instances of biking necessity. A bicycle with a properly designed suspension system is capable of traveling over extremely bumpy, uneven terrain and up or down very steep inclines. Suspension bicycles are less punishing, reduce fatigue and reduce the likelihood of injury to the rider, and are much more comfortable to ride. For off-road cycling in particular, a suspension system greatly increases the rider's ability to control the bicycle because the wheels remain in contact with the ground as they ride over rocks and bumps in the terrain instead of being bounced into the air as occurs on conventional non-suspension bicycles. Over the last several years the number of bicycles now equipped with suspension systems has dramatically increased.

Known shock absorbing systems typically include an oil damper operating in conjunction with a singular spring element (such as an air spring or a mechanical spring). However, issues exist with the use of know shock absorbing systems. For example, systems that utilize mechanical springs lack bottom out resistance or end stroke support, and systems utilizing air springs have harsh entry stroke support and a generally unsupportive or flat mid-stroke. Accordingly, an improved shock absorbing systems is desired and would be appreciated in the art.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a shock absorption assembly is provided. The shock absorption assembly includes an air shock that has a valve body. An air spring tube defines an air spring chamber. A piston rod extends through the air spring chamber to an oil piston head. An air piston head movably coupled to the piston rod. An oil damper tube is coupled to the piston head and is movable relative to the piston rod and the air spring tube. The shock absorption assembly further includes a mechanical spring disposed radially outward from, and that annularly surrounds, at least a portion of the air shock.

In accordance with another embodiment of the present disclosure, a shock absorption assembly is provided. The shock absorption assembly includes an air shock that has a valve body. An air spring tube defines an air spring chamber. A piston rod extends through the air spring chamber to an oil piston head. An air piston head movably coupled to the piston rod. An oil damper tube is coupled to the piston head and is movable relative to the piston rod and the air spring tube. The shock absorption assembly further includes a mechanical spring disposed radially outward from, and that annularly surrounds, at least a portion of the air shock. The mechanical spring extends between a first end coupled to the air spring tube and a second end coupled to the oil damper tube.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

As used herein, the term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component. terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Figure 1:
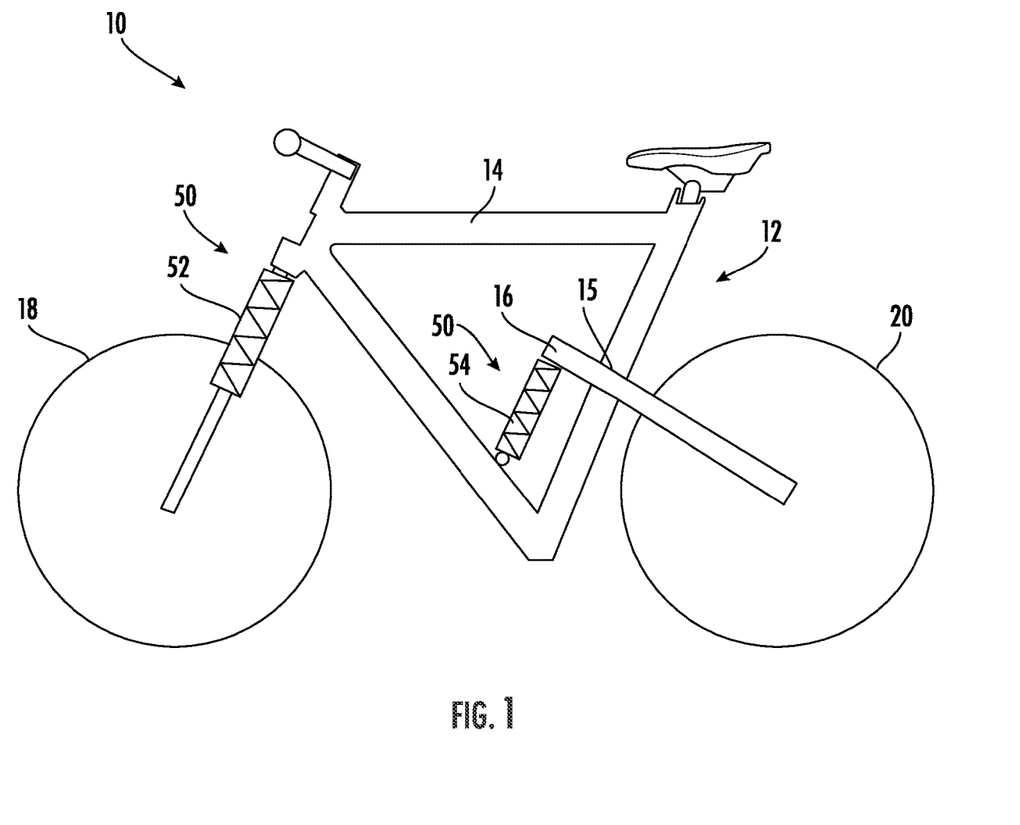
FIG. 1 illustrates a schematic view of a vehicle in accordance with embodiments of the present disclosure.

Referring now to the drawings, FIG. 1 illustrates a schematic diagram of a vehicle 10. In various embodiments, the vehicle 10 may be non-motor assisted, such as a bicycle or other human-powered vehicle. In other embodiments, the vehicle may be motor-assisted, such as a motorcycle or moped. In many embodiments, as shown, the vehicle 10 may include a frame 12. The frame 12 may include a first frame portion 14 and a second frame portion 16 pivotably coupled to one another (e.g., via one or more pins 15 or other rotatable couplings). As shown, a first wheel 18 may be coupled to the first frame portion 14, and a second wheel 20 may be coupled to the second frame portion 16. Additionally, as shown, the vehicle 10 may include one or more shock absorption assemblies 50 for dampening or reducing impulses experienced during operation of the vehicle 10. For example, the vehicle 10 may include a front shock absorption assembly 52 and a rear shock absorption assembly 54. In exemplary embodiments, the rear shock absorption assembly 54 may extend between, and couple to, the first frame portion 14 and the second frame portion 16 of the frame 12.

Figure 2:
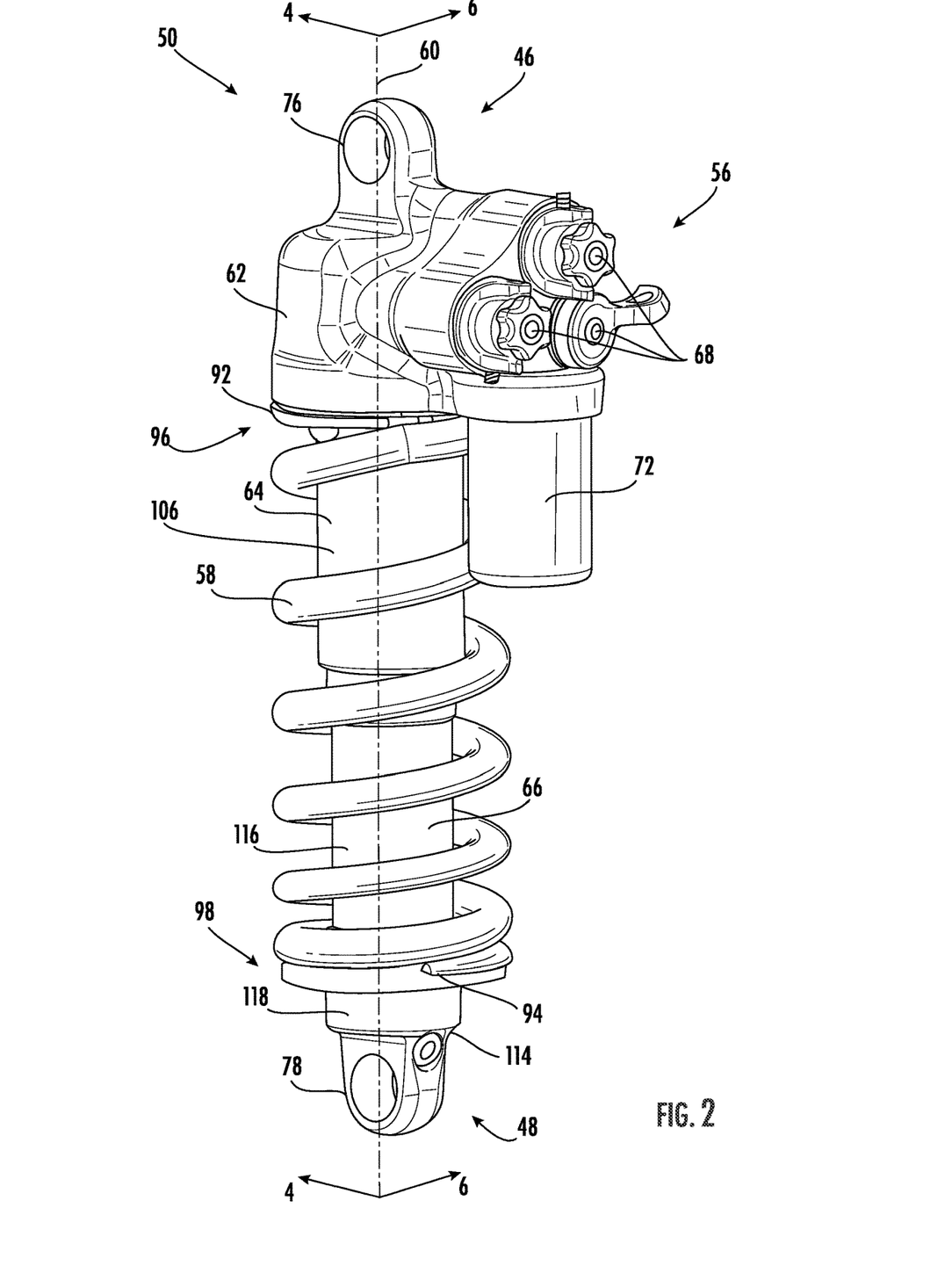
FIG. 2 illustrates a perspective view of a shock absorption assembly in accordance with embodiments of the present disclosure.
Figure 3:
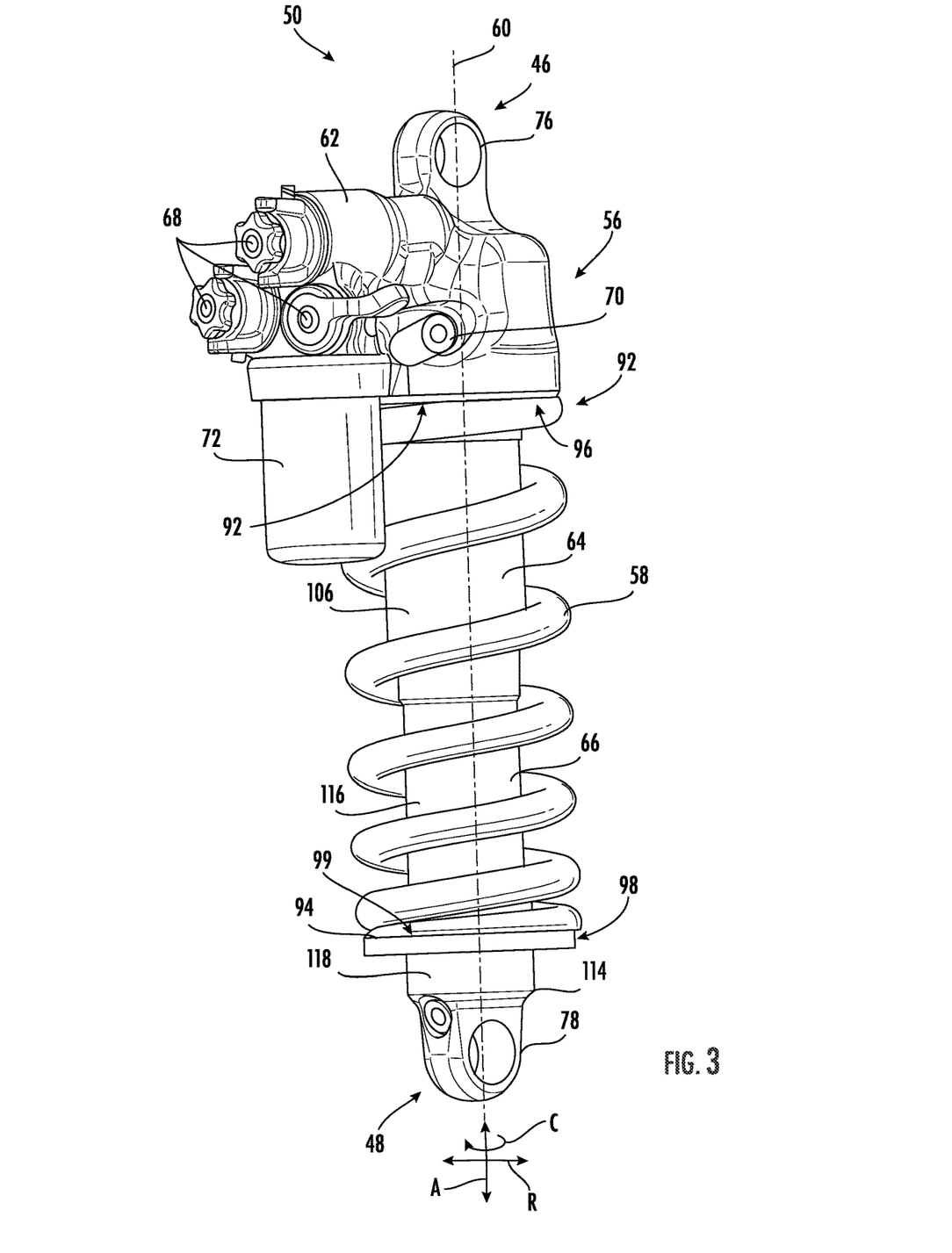
FIG. 3 illustrates a perspective view of a shock absorption assembly in accordance with embodiments of the present disclosure.

FIG. 2 and FIG. 3 each illustrate a perspective view of a shock absorption assembly 50 in accordance with embodiments of the present disclosure. As shown, the shock absorption assembly 50 may extend along an axial centerline 60 from a first end 46 to a second end 48. The shock absorption assembly 50 may define a cylindrical coordinate system relative to the axial centerline 60. The cylindrical coordinate system may include an axial direction A extending along the axial centerline 60, a radial direction R extending perpendicularly to the axial centerline 60, and a circumferential direction C extending about or around the axial centerline 60.

In exemplary embodiments, the shock absorption assembly 50 may include an air shock 56 and a mechanical spring 58 disposed radially outward from the air shock 56. The mechanical spring 58 may annularly surround at least a portion of the air shock 56. In various embodiments, the mechanical spring 58 may be a helical spring, a coil spring, a wave spring, or other suitable mechanical springs. For example, in exemplary embodiments, the mechanical spring 58 may be a helical spring. The air shock 56 and the mechanical spring 58 may be coaxial. For example, the air shock 56 and the mechanical spring 58 may be coaxially aligned, such that they share a common axial centerline (e.g., the axial centerline 60 of the entire shock absorption assembly 50), which may advantageously ensure an equal distribution of reactive forces from the air shock 56 and the mechanical spring 58. The air shock 56 and the mechanical spring 58 may work in conjunction with one another to dampen shocks, vibrations, or other impulses experienced by the vehicle 10 during operation thereof.

Figure 4:
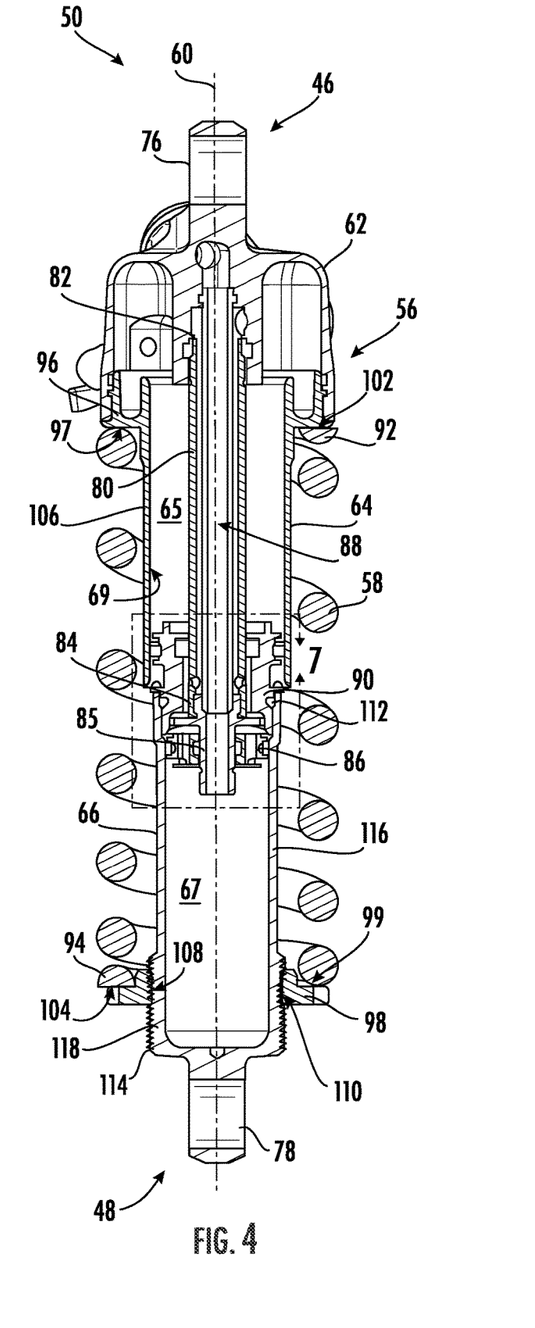
FIG. 4 illustrates a cross-sectional view of the shock absorption assembly from along the line 4-4 shown in FIG. 2 in accordance with embodiments of the present disclosure.

The air shock 56 may include a valve body 62, an air spring tube 64 coupled to the valve body 62, and an oil damper tube 66 coupled to the air spring tube 64. As discussed below, the air spring tube 64 may define an air spring chamber 65, and the oil damper tube 66 may define an oil chamber 67 (FIGS. 3 and 4). In many embodiments, the oil damper tube 66 may be movably or slidably coupled to the air spring tube 64, such that the oil damper tube 66 is movable in the axial direction A relative to the air spring tube 64.

The valve body 62 may include various knobs, switches, levers, or adjusters that may alter the dampening output (or resistance) of the air shock 56. For example, the valve body 62 may include damping adjusters 68 for adjusting the resistance of the air shock 56. Additionally, the valve body 62 may include an air valve 70 in fluid communication with the air spring chamber 65. The air valve 70 may be used for filling the air spring chamber 65 with air or other fluids. In some embodiments, a reservoir 72 may be coupled to the valve body 62. The reservoir 72 may extend generally axially alongside the mechanical spring 58, such that at least a portion of the mechanical spring 58 is disposed radially between the air spring tube 64 and the reservoir 72.

In many embodiments, the shock absorption assembly 50 may include a top end eye 76 disposed at the first end 46 of the shock absorption assembly 50 and a bottom end eye 78 disposed at the second end 48 of the shock absorption assembly 50. The top end eye 76 and the bottom end eye 78 may couple the shock absorption assembly 50 to the frame 12 of the vehicle 10. Particularly, in embodiments where the shock absorption assembly 50 is a rear shock absorption assembly 54 (or in other embodiments not shown), the top end eye 76 may couple to one of the first frame portion 14 or the second frame portion 16 of the frame 12, and the bottom end eye 78 may couple to the other of the first frame portion 14 or the second frame portion 16.

In exemplary embodiments, the top end eye 76 may be defined by the valve body 62, such that the top end eye 76 forms a portion of the valve body 62. In this way, the top end eye 76, the valve body 62, and the air spring tube 64 may be moveable together (e.g., as a unit) in the axial direction A relative to the oil damper tube 66. Similarly, the bottom end eye 78 may be defined by the oil damper tube 66, such that the bottom end eye 78 forms a portion of the oil damper tube 66. In this way, the bottom end eye 78 and the oil damper tube may be movable together (e.g., as a unit) in the axial direction A relative to the air spring tube 64.

Figure 5:
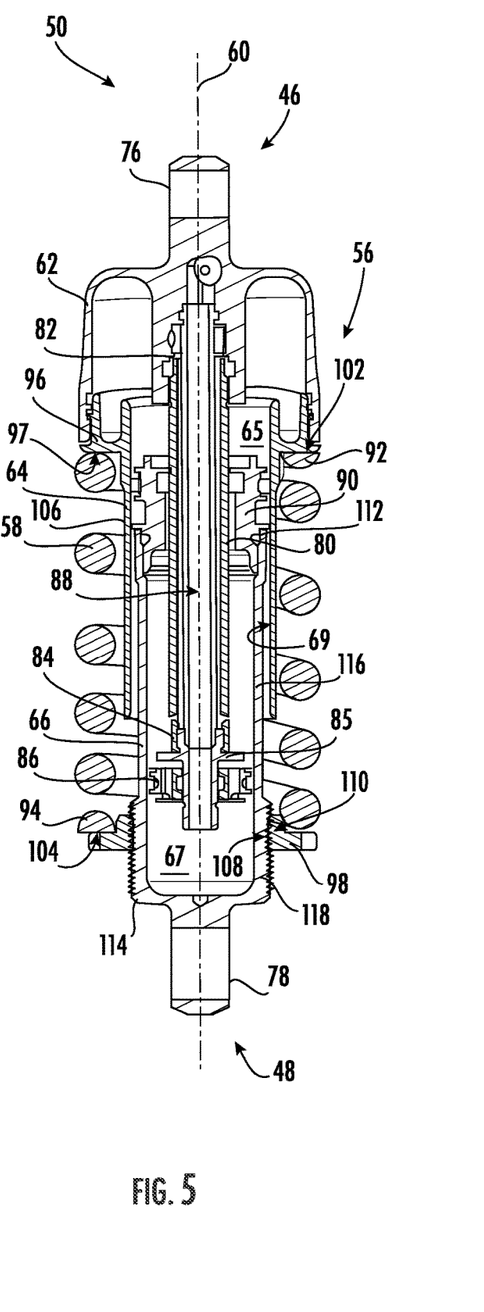
FIG. 5 illustrates a cross-sectional view of a shock absorption assembly in a compressed position in accordance with embodiments of the present disclosure.
Figure 6:
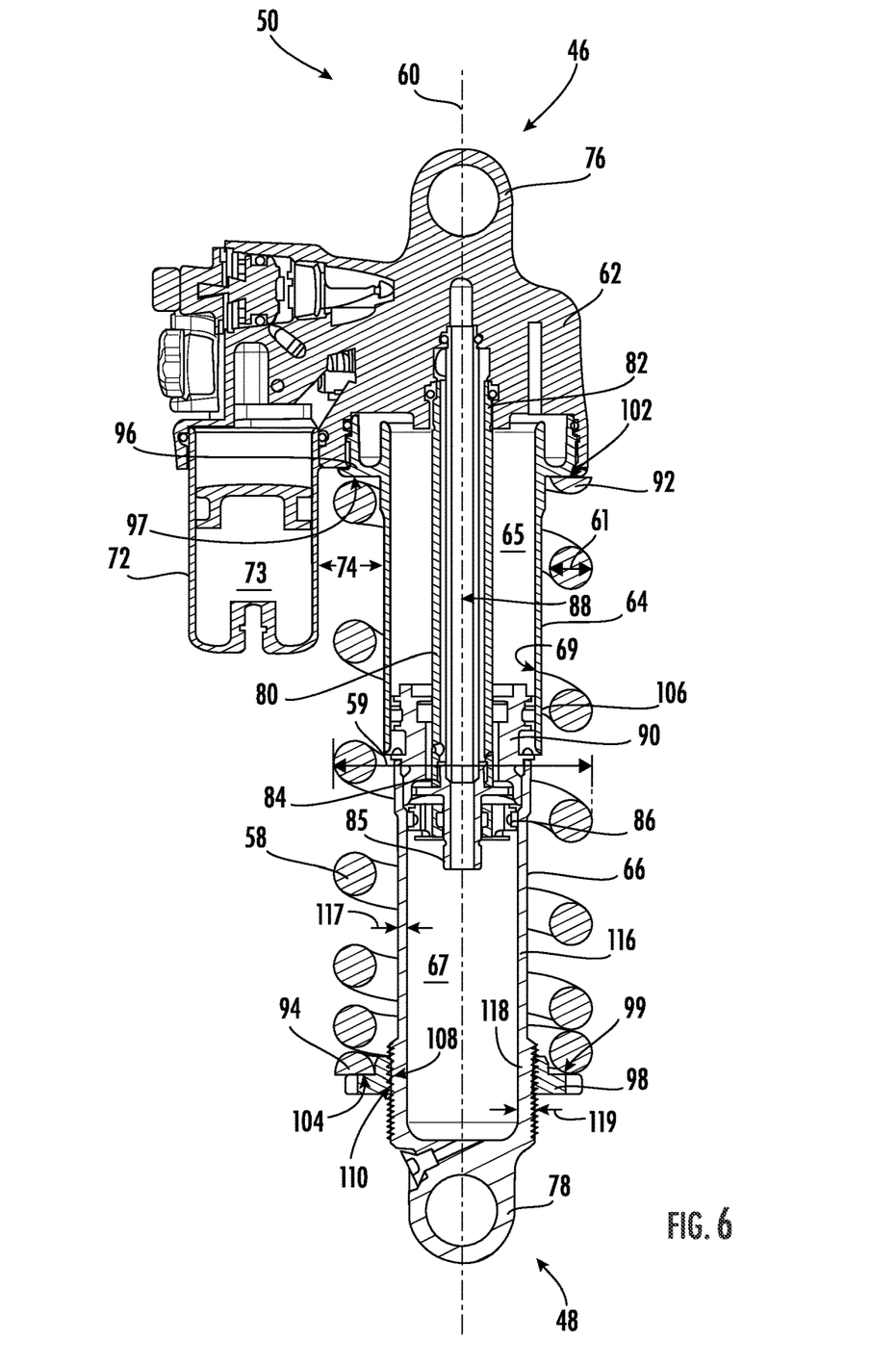
FIG. 6 illustrates a cross-sectional view of the shock absorption assembly from along the line 6-6 shown in FIG. 2 in accordance with embodiments of the present disclosure.

FIG. 4 illustrates a cross-sectional view of the shock absorption assembly 50 from along the line 4-4 shown in FIG. 2, which is in an uncompressed position. FIG. 5 illustrates a cross-sectional view of the shock absorption assembly 50 in an at least partially compressed position, in accordance with embodiments of the present disclosure. Additionally, FIG. 6 illustrates a cross-sectional view of the shock absorption assembly 50 from along the line 5-5 shown in FIG. 2. As discussed above and illustrated by comparing FIG. 4 and FIG. 5, the shock absorption assembly 50 may be axially compressible or movable. Specifically, the air spring tube 64 may be coupled to the valve body 62, and both the air spring tube 64 and the valve body 62 may be axially movable or slidable together relative to the oil damper tube 66.

As shown in FIGS. 4 through 6, the air spring tube 64 may define an air spring chamber 65, and the oil damper tube 66 may define an oil chamber 67. For example, the air spring chamber 65 may be filled with air or another suitable fluid (or gas), and the oil chamber 67 may be filled with oil or other suitable fluid (such as a lubricant or other fluid).

Figure 7:
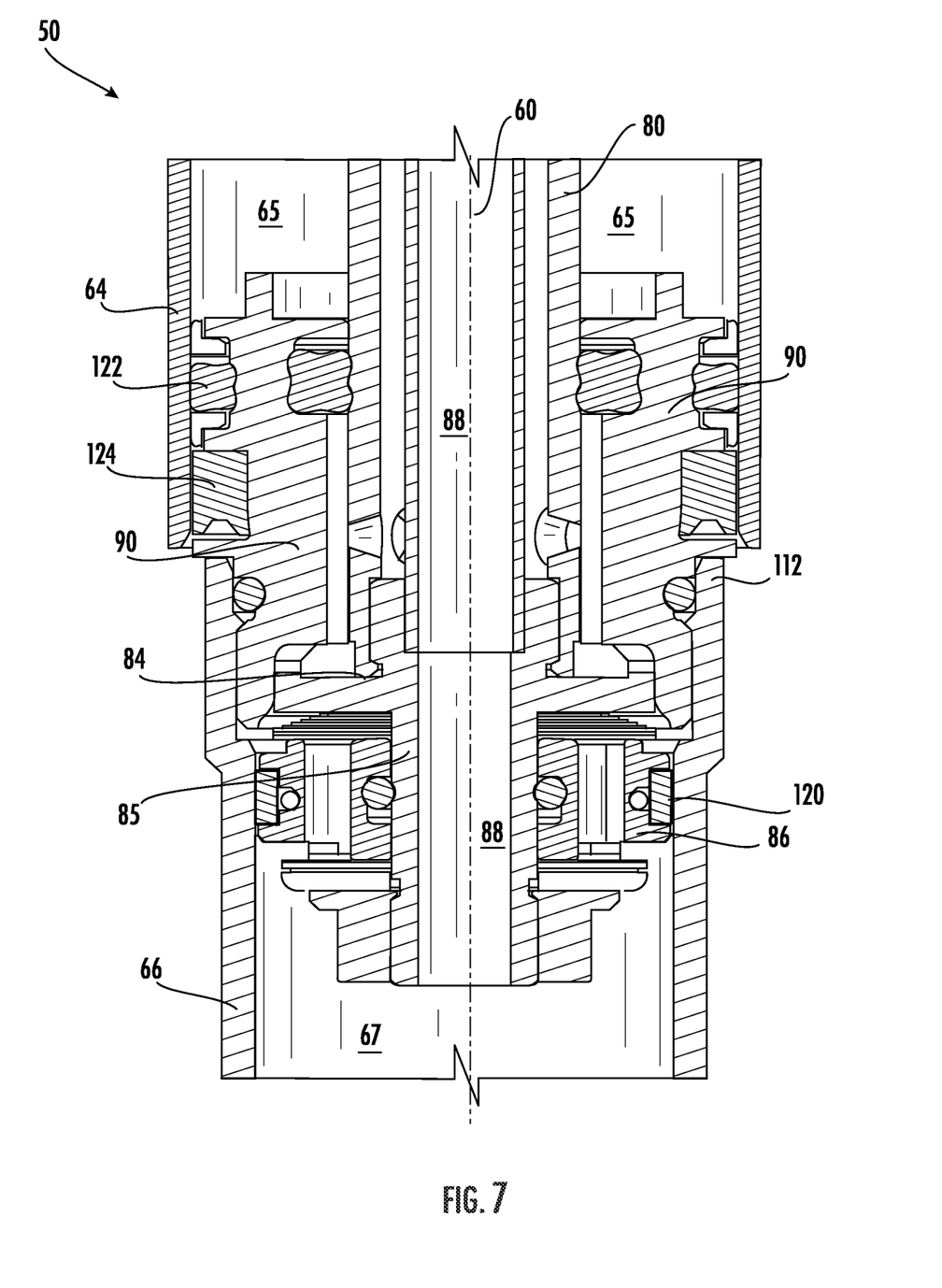
FIG. 7 illustrates an enlarged view of a shock absorption assembly in accordance with embodiments of the present disclosure.

In exemplary embodiments, a piston rod 80 may be disposed within air spring chamber 65. For example, the piston rod 80 may be coupled to the valve body 62 and may extend along an axial centerline of the shock absorption assembly 50 within the air spring chamber 65, such that the piston rod 80 is spaced apart from the air spring tube 64. In this way, the piston rod 80 may be at least partially surrounded (e.g., annularly) by the air spring chamber 65. Particularly, the piston rod 80 may extend from a first end 82 coupled to the valve body 62, through the air spring chamber 65, to a second end 84 coupled to an oil piston head 86. In particular embodiments, as shown in FIG. 7, a piston rod extension 85 may couple to the second end 84 of the piston rod 80 (e.g., via an interference fit, welding, or other coupling means). The piston rod extension 85 may be disposed within the oil chamber 67 and may fluidly couple the oil chamber 67 to the piston rod 80. The oil piston head 86 may annularly surround the piston rod extension 85 of the piston rod 80 and rigidly coupled thereto.

The oil piston head 86 may be disposed within the oil chamber 67 and may at least partially define a boundary (e.g., an axial boundary) of the oil chamber 67. The oil piston head 86 may be axially movable relative to the oil damper tube 66, and thus movable within the oil chamber 67 to compress the oil therewithin. In exemplary embodiments, the piston rod 80 may be a generally hollow body (such as a hollow cylinder). For example, the piston rod 80 and the piston rod extension 85 may define a channel 88 that fluidly couples the oil chamber 67 to the reservoir chamber 73. In operation, compression of the shock absorption assembly 50 may force oil from the oil chamber 67 to flow into the channel 88 and the reservoir chamber 73, and decompression of the shock assembly may force the oil to travel from the reservoir chamber 73 back through the channel 88 to the oil chamber 67.

In various embodiments, the shock absorption assembly 50 may further include an air piston head 90 coupled to the oil damper tube 66 and movably (or slidably) coupled to the piston rod 80. Stated otherwise, the oil damper tube 66 may be coupled to the air piston head 90, such that the oil damper tube 66 and the air piston head 90 are movable together relative to the piston rod 80 and the air spring tube 64. For example, the air piston head 90 may annularly surround the piston rod 80, such that the air piston head 90 is restricted to axial movement relative to the piston rod 80.

As should be appreciated, the valve body 62, the air spring tube 64, the piston rod 80, and the oil piston head 86 may all be rigidly, fixedly, or otherwise non-movably coupled to one another, such that the components move together as a unit in the shock absorption assembly 50. Similarly, the oil damper tube 66 and the air piston head 90 may be rigidly, fixedly, or otherwise non-movably coupled to one another, such that the components move together as a unit in the shock absorption assembly 50.

In many embodiments, the mechanical spring 58 may be disposed radially outward from and annularly surround at least a portion of the air shock 56. For example, the mechanical spring 58 may annularly surround the air spring tube 64 and the oil damper tube 66. Particularly, the mechanical spring 58 may extend between a first end 92 coupled to the air spring tube 64 and a second end 94 coupled to the oil damper tube 66. In this way, compression of the air shock 56 causes a compression of the mechanical spring 58.

In some embodiments, as shown in FIG. 6, a radial clearance 74 may be defined between the air spring tube 64 and the reservoir 72. The radial clearance 74 is particularly important because, as the air shock 56 and mechanical spring 58 compress, a width 59 of the mechanical spring 58 may increase (which must be accounted for in the radial clearance 74 to avoid damage-causing friction to the surrounding components). For example, the radial clearance may be between about 105% and about 200% of a diameter 61 of the mechanical spring 58, or such as between about 110% and about 180% of a diameter 61 of the mechanical spring 58, or such as between about 120% and about 160% of a diameter 61 of the mechanical spring 58, or such as between about 130% and about 150% of a diameter 61 of the mechanical spring 58.

In exemplary embodiments, the air shock 56 may further include a first platform 96 in contact with the first end 92 of the mechanical spring 58 and a second platform 98 in contact with the second end 94 of the mechanical spring 58. In particular, the first end 92 of the mechanical spring 58 may be coupled to the first platform 96 (e.g., via frictional contact, welding, or other suitable coupling means), and the second end 94 of the mechanical spring 58 may be coupled to the second platform 98 (e.g., via frictional contact, welding, or other suitable coupling means). In this way, the mechanical spring 58 may be disposed between (e.g., axially between) the first platform 96 and the second platform 98. More specifically, the first platform 96 may define a first annular surface 97 in contact with the first end 92 of the mechanical spring 58, and the second platform 98 may each define a second annular surface 99 in contact with the second end 94 of the mechanical spring 58. Both the first annular surface 97 and the second annular surface 99 may be generally flat, radially-extending, surfaces. This may be advantageous over, e.g., a curved or slanted surface, as the flat, radially-extending, annular surfaces 97, 99 provide the supporting surfaces for the mechanical spring to be positioned therebetween.

Additionally, as shown, the mechanical spring 58 may define a first flat surface 102 at the first end 92 and a second flat surface 104 at the second end 94. The first flat surface 102 may flushly and/or continuously contact the first annular surface 97 onto which the first flat surface 102 is seated. Similarly, the second flat surface 104 may flushly and/or continuously contact the second annular surface 99 onto which the second flat surface 104 is seated.

In exemplary embodiments, as shown, the first platform 96 may be defined by the air spring tube 64. For example, the air spring tube 64 may define a generally cylindrical main body 106, and the first platform 96 (e.g., and the first annular surface 97) may extend radially outwardly from the cylindrical main body 106 of the air spring tube 64. As discussed above, the first annular surface 97 may be entirely radially oriented, such that it does is not slanted, curved, or contoured, in order to allow the mechanical spring 58 to make sufficient contact therewith.

In many embodiments, the second platform 98 may be threadably coupled to the oil damper tube 66, such that rotation of the second platform 98 adjusts an axial position of the second platform, thereby adjusting a preload of the mechanical spring 58. In particular, the second platform 98 may be movable or adjustable along the axial centerline 60 of the shock absorption assembly 50 to adjust a preload of the mechanical spring 58. For example, the second platform 98 may define internal threads 108, and the oil damper tube 66 may define external threads 110 corresponding with the internal threads 108 of the second platform 98. In exemplary embodiments, the oil damper tube 66 may be generally shaped as a hollow cylinder. More particularly, the oil damper tube 66 may extend from a first end 112 coupled to the air piston head 90 to the bottom end eye 78 at a second end 114. The oil damper tube 66 may define a first portion 116 having a first thickness 117 and as second portion 118 having a second thickness 119. The first portion 116 may extend from the first end 112 to the second portion 118, and the second portion 118 may extend from the first portion 116 to the bottom end eye 78.

In various embodiments, as shown, the second platform 98 may be threadably coupled to the second portion 118 of the oil damper tube 66. Additionally, as shown, the second thickness 119 of the second portion 118 may be greater than the first thickness 117 of the first portion 116. The second thickness 119 may advantageously provide additional structural support to the second platform 98, which may experience a variety of forces during operation, thereby prolonging the hardware life of the overall shock absorption assembly 50.

As discussed above, the entire shock absorption assembly 50 may be movable between an uncompressed position (FIG. 4) and a compressed position (FIG. 5). Additionally, the air shock 56 and the mechanical spring 58 may be movable between a compressed position and an uncompressed position, which may or may not be the same as the entire shock absorption assembly 50. For example, because the second platform 98 is axially adjustable to modify a preload of the mechanical spring 58, the mechanical spring 58 may be at least partially compressed when the air shock 56 is in an uncompressed position, which may place the air shock 56 in tension. Thus, in such a configuration, the required force for engagement of the air shock 56 may be modified by adjusting a preload of the mechanical spring 58 (e.g., adjusting a position of the second platform 98), which may be advantageous.

In some embodiments, a spring constant of the mechanical spring 58 may be between about 100 lbs/inch (e.g., pounds per inch) and about 800 lbs/inch. In other embodiments, a spring constant of the mechanical spring 58 may be between about 200 lbs/inch and about 700 lbs/inch. In many embodiments, a spring constant of the mechanical spring 58 may be between about 300 lbs/inch and about 600 lbs/inch. In particular embodiments, a spring constant of the mechanical spring 58 may be between about 400 lbs/inch and about 500 lbs/inch.

Additionally, in many embodiments, the air spring chamber 65 may have a nominal pressure between about 0 lbs/inch and about 350 lbs/inch. In other embodiments, the air spring chamber 65 may have a nominal pressure between about 0 lbs/inch and about 300 lbs/inch. In various embodiments, the air spring chamber 65 may have a nominal pressure between about 0 lbs/inch and about 250 lbs/inch. In certain embodiments, the air spring chamber 65 may have a nominal pressure between about 0 lbs/inch and about 200 lbs/inch. In particular embodiments, the air spring chamber 65 may have a nominal pressure between about 0 lbs/inch and about 100 lbs/inch.

Referring now to FIG. 7, an enlarged view of the outlined detail shown in FIG. 4 is illustrated in accordance with embodiments of the present disclosure. As described above, the air spring tube 64, the piston rod 80, and the oil piston head 86 may all be rigidly, fixedly, or otherwise non-movably coupled to one another, such that the components move together as a unit in the shock absorption assembly 50. Similarly, the oil damper tube 66 and the air piston head 90 may be rigidly, fixedly, or otherwise non-movably coupled to one another, such that the components move together as a unit in the shock absorption assembly.

As shown in FIG. 7, the oil piston head 86 may form an interference fit with an internal diameter of the oil damper tube 66, but the oil piston head 86 may be slidably coupled to the oil damper tube 66, in order to compress the fluid within the oil chamber 67 during a compression cycle. In some embodiments, as shown, the oil piston head 86 may further include a piston band 120 annularly surrounding the oil piston head 86. The piston band 120 may advantageously prolong the hardware life of the oil piston head 86 and prevent fluid from leaking out of the oil chamber 67.

In certain embodiments, as discussed above, the air piston head 90 may be rigidly coupled to the oil damper tube 66, such that the air piston head 90 moves with the oil damper tube 66. For example, in some embodiments, the air piston head 90 may form an interference fit with the oil damper tube 66. In other embodiments, the air piston head 90 may be welded or otherwise fixedly coupled to the oil damper tube 66. Additionally, as shown, the air piston head 90 may extend into the air spring chamber 65. In exemplary embodiments, a seal ring 122 may annularly surround the air piston head 90. For example, the seal ring 122 may be disposed radially between the air piston head 90 and an internal surface 69 of the air spring tube 64. The seal ring 122 may form a seal between the air piston head 90 and the internal surface 69 of the air spring tube 64. In some embodiments, the air piston head 90 may further include a scraper seal 124 annularly surrounding the air piston head 90 within the air spring chamber 65. For example, the scraper seal 124 may be disposed radially between the air piston head 90 and the internal surface 69 of the air spring tube 64.

Figure 8:
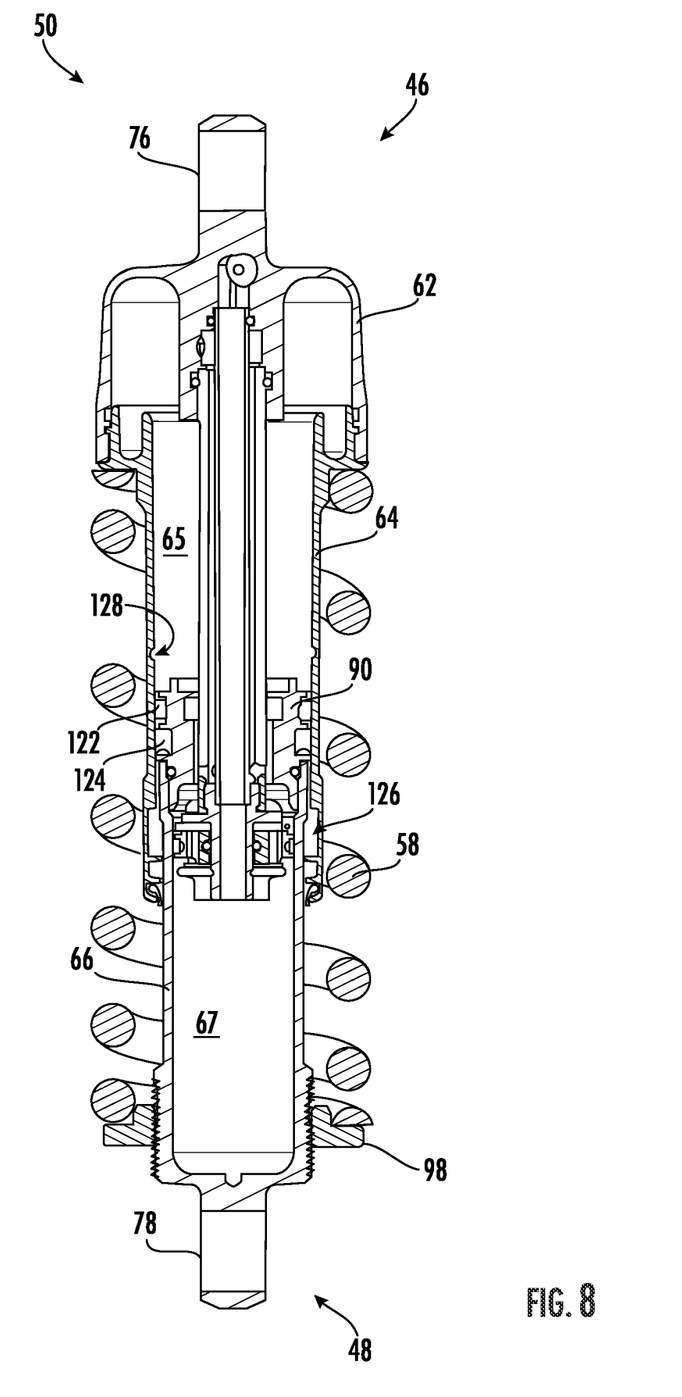
FIG. 8 illustrates a cross-sectional view of a shock absorption assembly in accordance with embodiments of the present disclosure.

FIG. 8 illustrates a cross-sectional view of a shock absorption assembly 50 in an uncompressed position, in accordance with embodiments of the present disclosure. As shown, the shock absorption assembly 50 may include a negative air spring chamber 126. The negative air spring chamber 126 may be defined between the air spring tube 64 and the oil damper tube 66. Specifically, the negative air spring chamber may be defined between an internal surface of the air spring tube 64 and an external surface of the oil damper tube 66. Additionally, the negative air spring chamber may be in fluid communication with the air spring chamber 65 during portions of the stroke of the shock absorption assembly 50, but the negative air spring chamber 126 may otherwise be fluidly isolated from the air spring chamber 65. For example, an interior surface of the air spring tube 64 may define a recess 128. In such embodiments, the air piston head 90 (and/or the seal ring 122 and the scraper seal 124) may come out of contact with the internal surface of the air spring tube 64 when the air piston head 90 is passing over the recess 128, such that the recess 128 may fluidly couple the negative air spring chamber 126 and the air spring chamber 65 when the air piston head 90 is passing thereover during the stroke of the shock absorption assembly 50. The negative air spring chamber 126 may advantageously balance the initial force generated by the air spring chamber 65. Additionally, the negative air spring chamber 126 shown in FIG. 8 may advantageously be defined between the generally concentric cylinder arrangement of the air spring tube 64 and the oil damper tube 66, which allows for the negative air spring chamber 126 to be utilized alongside the mechanical spring 58. For example, the concentric cylinder arrangement of the air spring tube 64 and the oil damper tube 66 may define the negative air spring chamber 126 without requiring a large protrusion, which could otherwise impede the mechanical spring 58.

Figure 9:
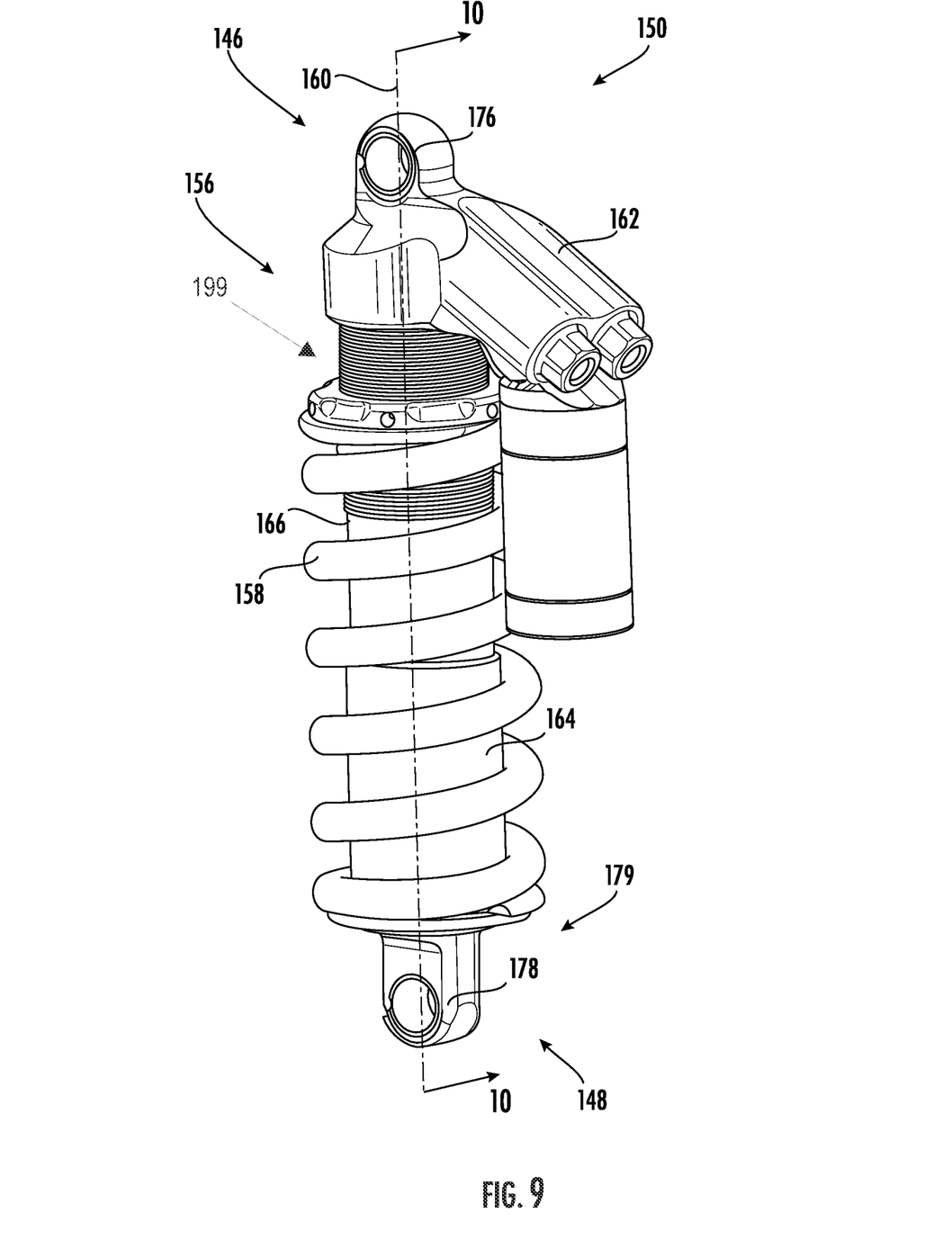
FIG. 9 illustrates a perspective view of a shock absorption assembly in accordance with embodiments of the present disclosure.

FIG. 9 illustrates a perspective view of a shock absorption assembly 150 in accordance with an alternative embodiment of the present disclosure. As shown in FIG. 9 and described below in more detail, the shock absorption assembly 150 may include an oil damper tube 166 and an air spring tube 164 in an opposite configuration as the oil damper tube 66 and air spring tube 64 described above with reference to FIGS. 1 through 8. The shock absorption assembly 150 may extend along an axial centerline 160 from a first end 146 to a second end 148.

In exemplary embodiments, the shock absorption assembly 150 may include an air shock 156 and a mechanical spring 158 disposed radially outward from the air shock 56. The mechanical spring 158 may annularly surround at least a portion of the air shock 156. The air shock 156 and the mechanical spring 158 may be coaxial. For example, the air shock 156 and the mechanical spring 158 may be coaxially aligned, such that they share a common axial centerline (e.g., the axial centerline 160 of the entire shock absorption assembly 150), which may advantageously ensure an equal distribution of reactive forces from the air shock 156 and the mechanical spring 158. The air shock 156 and the mechanical spring 158 may work in conjunction with one another to dampen shocks, vibrations, or other impulses experienced by the vehicle 10 during operation thereof.

Figure 10:
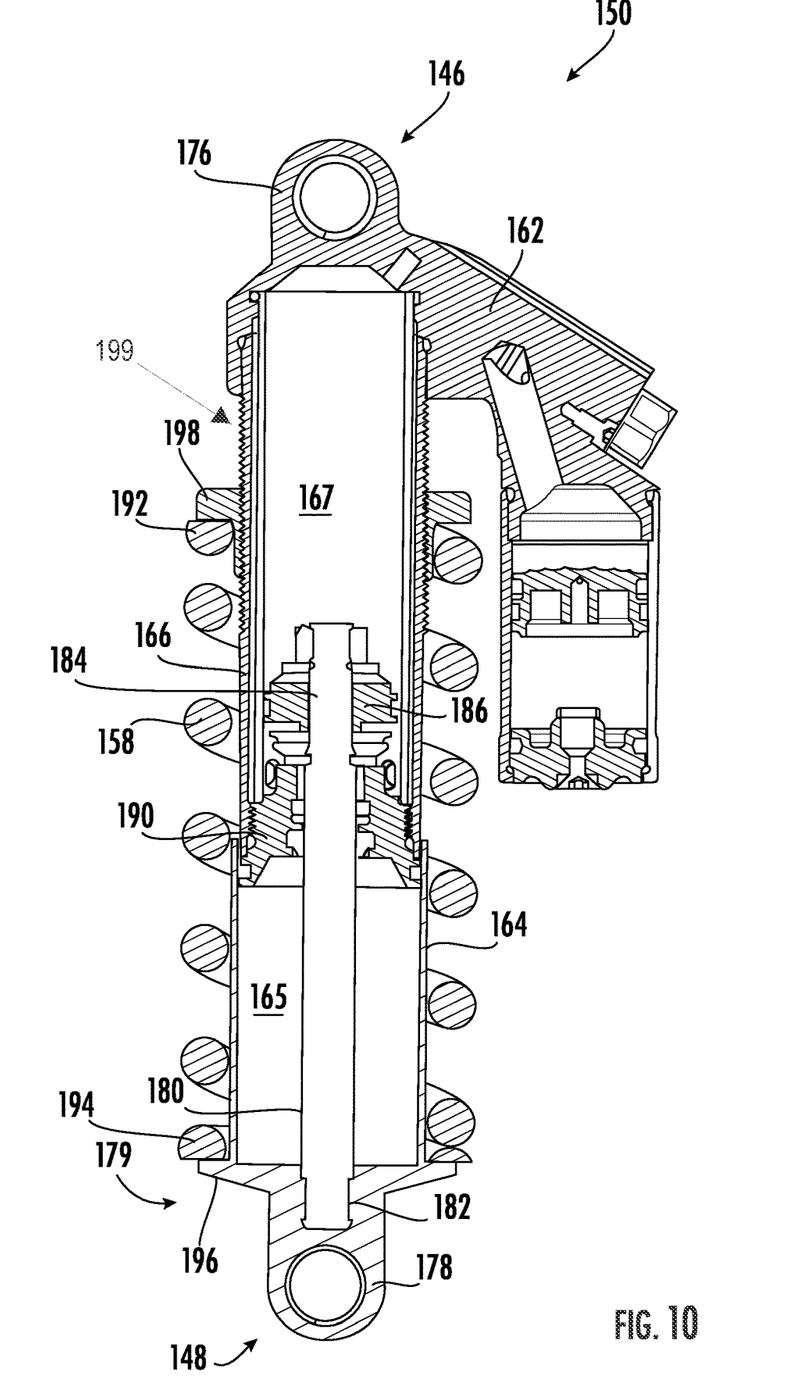
FIG. 10 illustrates a cross-sectional view of the shock absorption assembly shown in FIG. 9 from along the line 10-10 in accordance with embodiments of the present disclosure.

The air shock 156 may include a valve body 162, an oil damper tube 166 coupled to the valve body 162, and an air spring tube 164 coupled to oil damper tube 166. As discussed below, the air spring tube 164 may define an air spring chamber 165, and the oil damper tube 166 may define an oil chamber 167 (FIG. 10). In many embodiments, the oil damper tube 166 may be movably or slidably coupled to the air spring tube 164, such that the oil damper tube 166 is movable in the axial direction A relative to the air spring tube 164. In many embodiments, the shock absorption assembly 150 may include a top end eye 176 disposed at the first end 146 of the shock absorption assembly 150 and a bottom end eye 178 disposed at the second end 148 of the shock absorption assembly 150. The top end eye 176 may be defined by the valve body 162, and the bottom end eye 178 may be defined by a base 179.

FIG. 10 illustrates a cross-sectional view of the shock absorption assembly 150 from along the line 10-10 shown in FIG. 9. As shown, the oil damper tube 166 may be coupled to the valve body 162, and both the oil damper tube 166 and the valve body 162 may be axially movable or slidable together relative to the air spring tube 164.

As shown in FIG. 10, the air spring tube 164 may define an air spring chamber 165, and the oil damper tube 166 may define an oil chamber 167. For example, the air spring chamber 165 may be filled with air or another suitable fluid (or gas), and the oil chamber 167 may be filled with oil or other suitable fluid (such as a lubricant or other fluid).

In exemplary embodiments, a piston rod 180 may be disposed within air spring chamber 165. For example, the piston rod 180 may be coupled to the base 179 and may extend along an axial centerline of the shock absorption assembly 150 within the air spring chamber 165, such that the piston rod 180 is spaced apart from the air spring tube 164. In this way, the piston rod 180 may be at least partially surrounded (e.g., annularly) by the air spring chamber 165. Particularly, the piston rod 180 may extend from a first end 182 coupled to the valve body 62, through the air spring chamber 165, to a second end 184 coupled to an oil piston head 186.

In various embodiments, the shock absorption assembly 150 may further include an air piston head 190 coupled to the oil damper tube 166 and movably (or slidably) coupled to the piston rod 180. Stated otherwise, the oil damper tube 166 may be coupled to the air piston head 190, such that the oil damper tube 166 and the air piston head 190 are movable together relative to the piston rod 180 and the air spring tube 164. For example, the air piston head 190 may annularly surround the piston rod 180, such that the air piston head 190 is restricted to axial movement relative to the piston rod 180.

In many embodiments, the mechanical spring 158 may be disposed radially outward from and annularly surround at least a portion of the air shock 156. For example, the mechanical spring 158 may annularly surround the air spring tube 164 and the oil damper tube 166. Particularly, the mechanical spring 158 may extend between a first end 192 coupled to the oil damper tube 166 and a second end 194 coupled to the air spring tube 164. In this way, compression of the air shock 156 causes a compression of the mechanical spring 158.

In exemplary embodiments, the air shock 156 may further include a first platform 196 defined by the base 179 and in contact with the second end 194 of the mechanical spring 158 and a second platform 198 in contact with the first end 192 of the mechanical spring 58. The second platform 198 may be threadably coupled to the oil damper tube 166 (e.g., via threads 199), such that rotation of the second platform 198 adjusts an axial position of the second platform, thereby adjusting a preload of the mechanical spring 158. In particular, the second platform 198 may be movable or adjustable along the axial centerline 160 of the shock absorption assembly 50 to adjust a preload of the mechanical spring 158.

Figure 11:
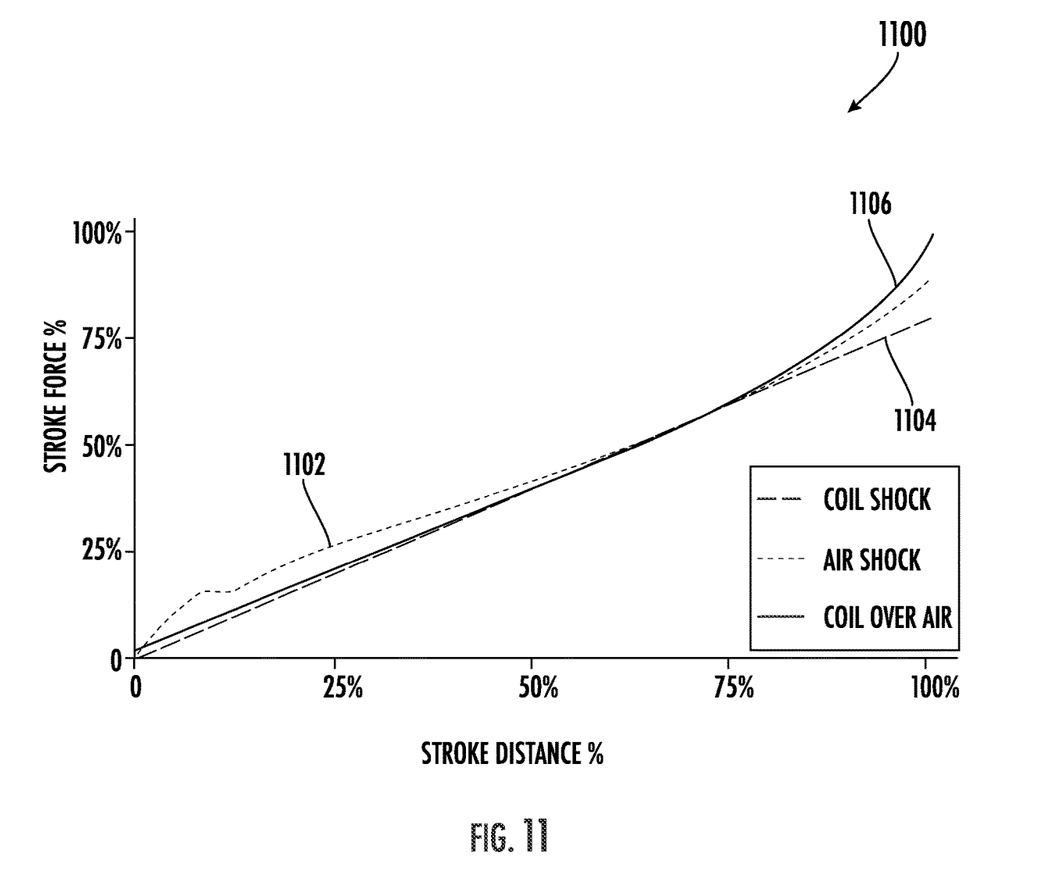
FIG. 11 is a graph of stroke force versus stroke distance for three separate shock absorption devices in accordance with one or more exemplary aspects of the present disclosure.

FIG. 11 is a graph 1100 of stroke force versus stroke distance (each expressed in terms of a percentage, e.g, 0% to 100%) for three separate shock absorption devices. For example, the graph 1100 shows a coil shock 1104, an air shock 1102, and a coil over air shock 1106. The coil over air shock 1106 may be representative of the shock absorption assembly 50, 150 described above with reference to FIGS. 1 through 10. As shown, the coil shock 1104 includes a generally linear stroke force progression through the stroke distance. The air shock 1102 includes a large entry stroke force during the first half of the stroke distance (e.g., about 0% to about 50% of the stroke distance), such that a large amount of force may be required to engage the air shock 1102. The air shock 1102 also includes a progressive force ramp at during the second half of the stroke distance (e.g., about 50% to about 100%). In this way, the air shock 1102 may generate a large amount of force at the beginning and end of the stroke. The coil over air shock 1106 may advantageously include a low initiation force (e.g., low stroke force into the beginning of the stroke distance) and a supportive and progressive end of stroke force (e.g., at the end of the stroke distance).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A shock absorption assembly comprising:
an air shock comprising a valve body, an air spring tube defining an air spring chamber, a piston rod extending through the air spring chamber to an oil piston head, an air piston head movably coupled to the piston rod, and an oil damper tube coupled to the piston head and movable relative to the piston rod and the air spring tube, wherein a first platform extends form the air spring tube and a second platform extends from the oil damper tube; and
a mechanical spring disposed radially outward from and annularly surrounding the air spring tube and the oil damper tube, the mechanical spring extending from a first end in contact with the first platform to a second end in contact with the second platform, wherein the shock absorption assembly is movable between an uncompressed position and a compressed position in which both the air shock and mechanical spring compress, wherein the air piston head is disposed closer to the first platform in the compressed position than in the uncompressed position, and wherein the oil piston head is disposed closer to the second platform in the compressed position than in the uncompressed position.

2. The shock absorption assembly as in claim 1, wherein the second platform is movable along an axial centerline of the shock absorption assembly to adjust a preload of the mechanical spring.

3. The shock absorption assembly as in claim 1, wherein the second platform is threadably coupled to the oil damper tube such that rotation of the second platform adjusts a preload of the mechanical spring.

4. The shock absorption assembly as in claim 1, wherein the air shock and the mechanical spring are coaxial.

5. The shock absorption assembly as in claim 1, wherein a spring constant of the mechanical spring is between about 100 lbs/inch and about 800 lbs/inch.

6. The shock absorption assembly as in claim 1, wherein the air spring chamber has a nominal pressure between about 0 lbs/inch and about 350 lbs/inch.

7. The shock absorption assembly as in claim 1, wherein the oil damper tube includes a first portion having a first thickness and a second portion having a second thickness, and wherein the second thickness is greater than the first thickness.

8. The shock absorption assembly as in claim 7, wherein the second platform is threadably coupled to the second portion of the oil damper tube.

9. The shock absorption assembly as in claim 1, further comprising a reservoir coupled to the valve body, wherein a radial clearance is defined between the reservoir and the air spring tube, wherein the mechanical spring is a coil spring that defines a width and a diameter, and wherein the radial clearance is larger than a diameter of the coil spring.

10. The shock absorption assembly as in claim 9, wherein the radial clearance is between about 105% and about 200% of the diameter of the coil spring.

11. The shock absorption assembly as in claim 1, wherein the oil damper tube defines an oil chamber filled with a first fluid, wherein the air spring tube defines an air spring chamber filled with a second fluid.

12. The shock absorption assembly as in claim 1, wherein the oil chamber is fluidly isolated from the air spring chamber.

13. A shock absorption assembly comprising:
an air shock comprising a valve body, an air spring tube defining an air spring chamber, a piston rod extending through the air spring chamber to an oil piston head, an air piston head movably coupled to the piston rod, and an oil damper tube coupled to the piston head and movable relative to the piston rod and the air spring tube, wherein a first platform extends form the air spring tube and a second platform extends from the oil damper tube; and
a mechanical spring disposed radially outward from and annularly surrounding the air spring tube and the oil damper tube, the mechanical spring extending between a first end coupled to the first platform and a second end coupled to the second platform, wherein the shock absorption assembly is movable between an uncompressed position and a compressed position in which both the air shock and mechanical spring compress, wherein the air piston head is disposed closer to the first platform in the compressed position than in the uncompressed position, and wherein the oil piston head is disposed closer to the second platform in the compressed position than in the uncompressed position.

14. The shock absorption assembly as in claim 13, wherein the second platform is movable along an axial centerline of the shock absorption assembly to adjust a preload of the mechanical spring.

15. The shock absorption assembly as in claim 13, wherein the second platform is threadably coupled to the oil damper tube such that rotation of the second platform adjusts a preload of the mechanical spring.

16. The shock absorption assembly as in claim 13, wherein the air shock and the mechanical spring are coaxial.

17. The shock absorption assembly as in claim 13, wherein the oil damper tube includes a first portion having a first thickness and a second portion having a second thickness, and wherein the second thickness is greater than the first thickness, wherein the air shock includes a first platform, and wherein a second platform is threadably coupled to the second portion of the oil damper tube.

* * * * *